(12) United States Patent
Park et al.

(10) Patent No.: US 7,140,073 B2
(45) Date of Patent: Nov. 28, 2006

(54) ROTATION-STOP MECHANISM FOR FOLDER OF PORTABLE WIRELESS TERMINAL

(75) Inventors: Jun-Kyu Park, Kyongsangbuk-do (KR); Eon-Seog Cheon, Kumi-shi (KR)

(73) Assignee: Samsung Electronics,Co., Ltd., Suwon (KR)

( * ) Notice: Subject to any disclaimer, the term of this patent is extended or adjusted under 35 U.S.C. 154(b) by 31 days.

(21) Appl. No.: 10/725,371

(22) Filed: Dec. 3, 2003

(65) Prior Publication Data

US 2004/0211036 A1 Oct. 28, 2004

(30) Foreign Application Priority Data

Apr. 25, 2003 (KR) .................. 10-2003-0026320

(51) Int. Cl.
*E05D 11/10* (2006.01)
(52) U.S. Cl. ................... 16/348; 16/324; 16/330; 16/303; 379/433.12
(58) Field of Classification Search .......... 16/348, 16/324, 321, 326–328, 330, 303, 334; 403/119, 403/120; 361/680–681, 814; 455/575.1, 455/575.4, 575.8, 550.1, 90.3; 379/433.12, 379/433.13
See application file for complete search history.

(56) References Cited

U.S. PATENT DOCUMENTS

| | | | | |
|---|---|---|---|---|
| 5,259,019 A | * | 11/1993 | Stilley ................... | 455/575.3 |
| 5,628,089 A | * | 5/1997 | Wilcox et al. ........... | 16/303 |
| 5,745,567 A | * | 4/1998 | Middleton ............... | 379/433.13 |
| 5,923,751 A | * | 7/1999 | Ohtsuka et al. .......... | 379/433.13 |
| 5,987,122 A | * | 11/1999 | Daffara et al. .......... | 379/433.13 |
| 5,996,178 A | * | 12/1999 | Murray .................. | 16/303 |
| 5,996,179 A | * | 12/1999 | Huong .................. | 16/330 |
| 6,085,387 A | * | 7/2000 | Han ..................... | 16/330 |
| 6,125,507 A | * | 10/2000 | Katoh ................... | 16/329 |
| 6,148,480 A | * | 11/2000 | Cooke ................... | 16/303 |
| 6,292,980 B1 | * | 9/2001 | Yi et al. ................ | 16/303 |
| 6,459,887 B1 | * | 10/2002 | Okuda ................... | 455/90.1 |
| 6,789,292 B1 | * | 9/2004 | Oshima et al. ........... | 16/297 |

FOREIGN PATENT DOCUMENTS

| | | | |
|---|---|---|---|
| EP | 1460836 A2 | * | 9/2004 |
| JP | 2002303316 A | * | 10/2002 |
| JP | 2002310132 A | * | 10/2002 |
| JP | 2002364629 A | * | 12/2002 |
| JP | 2003120651 A | * | 4/2003 |
| JP | 2003322141 A | * | 11/2003 |

* cited by examiner

*Primary Examiner*—Chuck Y. Mah
(74) *Attorney, Agent, or Firm*—Roylance,Abrams,Berdo & Goodman, L.L.P.

(57) ABSTRACT

Disclosed herein is a rotation-stop mechanism for a folder of a portable wireless terminal. The rotation-stop mechanism enables the folder to be opened away from the terminal body at various angles, according to the user's need, while smoothly maintaining the opening and closing operation of the folder. The rotation-stop mechanism can stop the rotation of the folder in a state wherein the folder is opened away from the terminal body at an angle of or about 90°, according to the user's need, while allowing the folder to be smoothly opened away from or closed to the terminal body. Further, the folder can be freely opened away from the terminal body at angles of at or about 90° or at or about 150°. Furthermore, in the case of the portable wireless terminal installed with a camera lens, since the folder can be firmly fixed when it is opened away from the terminal body at an angle of or about 90°, the portable wireless terminal is advantageous for stable image capturing and video communications.

18 Claims, 13 Drawing Sheets

ROTATION-STOP MECHANISM FOR FOLDER OF PORTABLE WIRELESS TERMINAL

PRIORITY

This application claims priority to an application entitled "ROTATION-STOP MECHANISM FOR FOLDER OF PORTABLE WIRELESS TERMINAL", filed in the Korean Industrial Property Office on Apr. 25, 2003 and assigned Serial No. 2003-26320, the contents of which are hereby incorporated by reference.

BACKGROUND OF THE INVENTION

1. Field of the Invention

The present invention relates to a portable wireless terminal, and more particularly to a hinge module for a portable wireless terminal.

2. Description of the Related Art

Generally, portable wireless terminals (terminals) can be classified according to their shape. For example, there are bar type terminals, flip type terminals and folder type terminals.

The bar type terminals are configured as a single body housing, and comprise data inputs and outputs, and receiver and transmitter modules. In the case of the bar type terminals, there is a disadvantage in this configuration, since a keypad used as data input means is always exposed to the outside, thereby causing the keypad to malfunction. In addition, the bar type terminals have a limit in their miniaturization due to a required minimal distance between the receiver and transmitter modules.

The flip type terminals generally comprise a terminal body, a flip cover, and a hinge module adapted to rotatably couple the flip cover to the terminal body. The terminal body is mounted with data inputs and outputs, and receiver and transmitter modules. The flip cover serves to cover a keypad used as data input means, thereby preventing malfunctioning of the keypad as in the bar type terminal. However, the flip type terminals also have a limit to their miniaturization due to the required minimal distance between the receiver and transmitter modules.

The folder type terminals generally comprise a terminal body, a folder, and a hinge module adapted to rotatably couple the folder to the terminal body. The folder type terminal is thereby opened or closed by the rotation of the folder relative to the terminal body. In a folded state, wherein the folder is in contact with the terminal body, the portable wireless terminal is in a call waiting mode thereby preventing malfunction of the keypad as a data input, since the keypad is mounted on the terminal body. Furthermore, when the folder type terminal is rotated from a folded position to an open position, the portable wireless terminal enters the conversation mode. This "unfolding" provides sufficient distance between the transmitter and receiver modules, thereby allowing miniaturization of the terminal. For these reasons, folder type terminals have increased in popularity.

In the flip type or folder type terminal the hinge module is adapted to rotatably couple the flip cover or folder to the terminal body. In these two terminal types, when the flip cover or folder is opened away from the terminal body in excess of a predetermined angle the hinge module is configured to cause the flip cover or folder to be forced towards its open position, without requiring any additional external force if, however, the flip cover or folder is opened below the predetermined angle, the flip cover or folder is forced to come into close contact with the terminal body (i.e., it is pre-disposed to shut when opened below a certain angle).

The conventional hinge module for use in the flip type or folder type portable wireless terminals is disclosed in U.S. Pat. No. 6,292,980, issued to Yi et al. on Sep. 25, 2001, the entire contents of which are incorporated herein by reference. The disclosed hinge module, comprises a hinge cam and hinge shaft, which are formed with mountain-shaped portions or valley-shaped portions, respectively, and a hinge spring received in a hinge housing and adapted to urge the hinge cam to come into close contact with the hinge shaft. In this case, the hinge module is designed to open and close a flip cover or folder of a portable wireless terminal by means of the mountain-shaped and valley-shaped portions and by means of elastic force of the hinge spring for urging the mountain-shaped portions to come into close contact with the valley-shaped portions.

Although the number of functions of the portable wireless terminals has rapidly increased as mobile services have become increasingly diversified, the conventional hinge module retains the simple function of causing the flip cover or folder of the portable wireless terminal to be opened away from, or closed to, the terminal body. This functionality limits modification of the specifications of the portable wireless terminals. For example, there are limitations to the addition of certain devices to the terminals for utilizing various mobile services. In addition to the limitations of specification and design of the terminals, the conventional hinge module has an additional disadvantage in that it cannot satisfy diverse customers' tastes and increasingly diversified mobile services.

SUMMARY OF THE INVENTION

Therefore, the present invention has been made to solve at least the above problems and/or disadvantages and to provide at least the advantages described below. Accordingly, it is therefore an object of the present invention to provide a rotation-stop mechanism for a folder of a portable wireless terminal, which is advantageous in enabling changes to specification and design of the portable wireless terminal.

It is another object of the present invention to provide a rotation-stop mechanism for a folder of a portable wireless terminal, which can satisfy increasingly diversified customers' tastes.

It is yet another object of the present invention to provide a rotation-stop mechanism for a folder of a portable wireless terminal, which is advantageous in enabling the rotation of the folder to be stopped at various different angles.

In accordance with one aspect of the present invention, the above and other objects can be accomplished by the provision of a rotation-stop mechanism for a folder of a portable wireless terminal, the portable wireless terminal comprising a terminal body, the folder rotatably coupled to the terminal body and adapted to rotate about a first rotation axis extending transversely to the terminal body so as to be opened away from or closed to the terminal body, and a hinge module for rotatably coupling the terminal body to the folder. The terminal body is formed with side hinge arms at both sides of its one end, and the folder is formed at its one end with a center hinge arm rotatably coupled between the side hinge arms through the hinge module, and the hinge module is received in the center hinge arm and adapted to provide a rotating force for causing the folder to be opened away from or closed to the terminal body according to its opened angle from the terminal body. The rotation-stop mechanism comprises a hinge dummy having at least two hinge holes extending radially, the hinge dummy being fixed to an inner surface of one of the side hinge arms, a hinge protrusion protruded through one end of the hinge module and adapted to be selectively coupled into one of the hinge holes, and a button mounted on one of the side hinge arms, the button serving to separate the hinge protrusion from the hinge hole.

In accordance with another aspect of the present invention, there is provided a rotation-stop mechanism for a folder of a portable wireless terminal, the portable wireless terminal comprising a terminal body formed with side hinge arms at both sides of its one end, the folder formed at its one end with a center hinge arm rotatably coupled between the side hinge arms and adapted to rotate about a first rotation axis extending transversely to the terminal body, and a hinge module for rotatably coupling the terminal body to the folder. The hinge module comprises a hinge housing received in the center hinge arm, the hinge housing having a receiving space opened at its one side, an opening formed at one end thereof, and a sliding guide slit extending longitudinally along an inner surface thereof, and a hinge shaft rotatably received in one end of the receiving space defined in the hinge housing, the hinge shaft being formed at its one end with a hinge protrusion protruding outwardly through the opening of the hinge housing and at the other end with valley-shaped portions. The hinge module further comprises a hinge cam formed at its one end with mountain-shaped portions corresponding to the valley-shaped portions of the hinge shaft, and at its outer peripheral surface with a sliding step corresponding to the sliding guide slit of the hinge housing, the hinge cam being adapted to linearly reciprocate within the receiving space, and elastic means adapted to support the other end of the hinge cam and to cause the hinge cam to come into close contact with the hinge shaft. The rotation-stop mechanism comprises a hinge dummy fixed to an inner surface of one of the side hinge arms, the hinge dummy having radially extended first and second hinge holes, the first and second hinge holes crossing each other at a certain angle on the first rotation axis, thereby being selectively coupled with the hinge protrusion.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
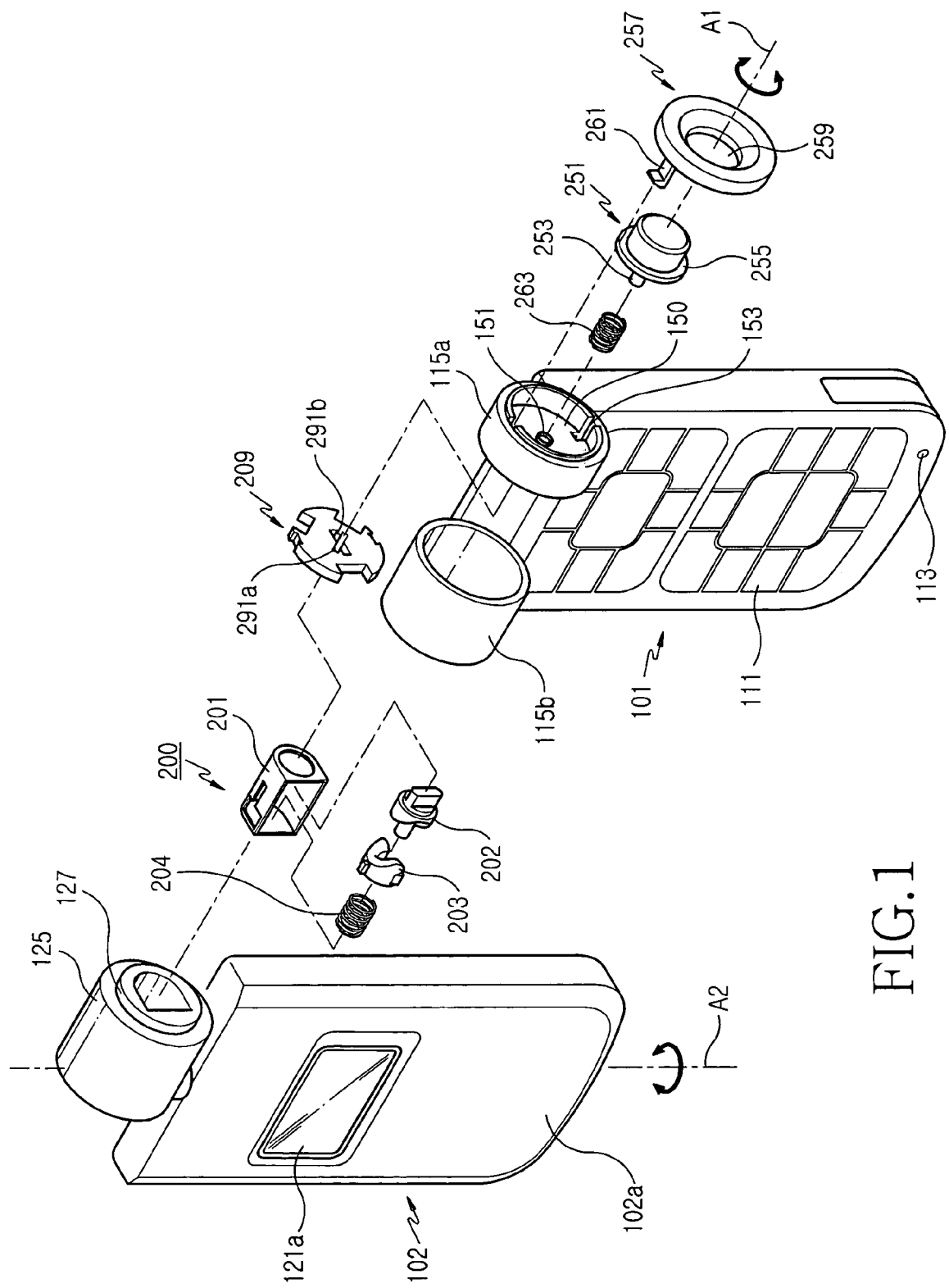
FIG. 1 is an exploded perspective view illustrating a portable wireless terminal having a rotation-stop mechanism for its folder in accordance with an embodiment of the present invention.

Various embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear. Also, the terms used in the following description are terms defined taking into consideration the functions obtained in accordance with various embodiments of the present invention. The definitions of these terms should be determined based on the whole content of this specification because it may be changed in accordance with the option of a user or a usual practice.

FIG. 1 is an exploded perspective view illustrating a portable wireless terminal having a rotation-stop mechanism for its folder in accordance with an embodiment of the present invention. As shown in FIG. 1, a portable wireless terminal 100, having a rotation-stop mechanism of the present invention, comprises a terminal body 101, a folder 102 adapted to be rotatably coupled to the terminal body 101, and a hinge module 200 received in one end region of the folder 102 and adapted to rotatably couple the folder 102 to the terminal body 101. The folder 102 is adapted to rotate about a first rotation axis A1 provided by the hinge module 200, thereby being opened away from or closed to the terminal body 101. The hinge module 200 constitutes a rotation-stop mechanism for the folder 102, along with a hinge dummy 209.

The terminal body 101 is provided at its front surface with a keypad 111 and a transmitter 113, and at both sides of its upper end with respective side hinge arms 115a and 115b. One of the side hinge arms 115b has a relatively large width than the other one 115a. This is enables a camera unit 109 (shown in FIG. 10) to be installed inside the relatively large side hinge arm 115b. The other side hinge arm 115a is formed at its outer side surface with a seating surface 150, which is depressed inwardly to a certain depth. In addition, the side hinge arm 115a is formed with fitting slots 153 at certain positions along the edge of the seating surface 150. The fitting slots 153 penetrate the seating surface 150, thereby communicating inner and outer sides of the side hinge arm 115a. The seating surface 150 is formed at its center point with a perforated hole 151. The perforated hole 151 is positioned on the first rotation axis A1.

Figure 11:
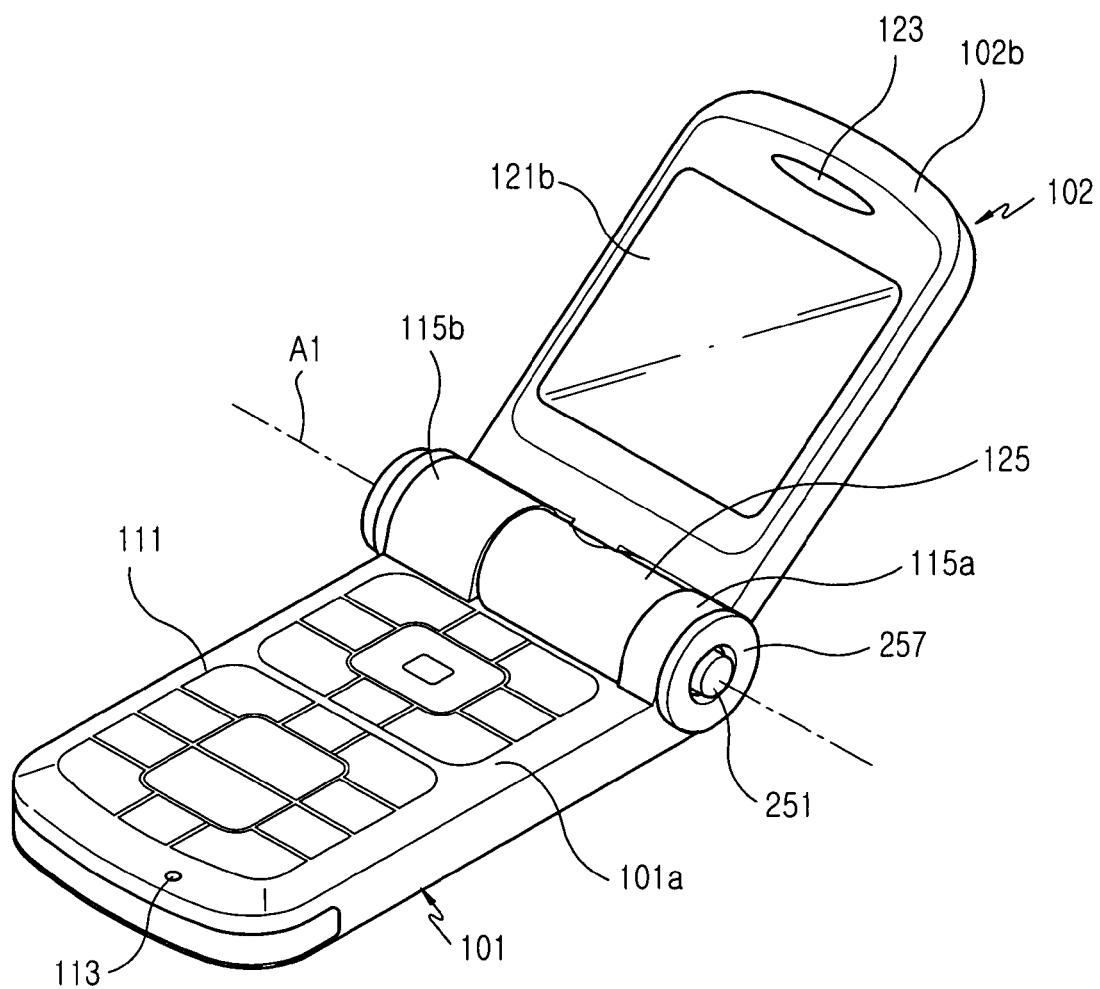
FIG. 11 is a perspective view illustrating a state wherein the folder of the portable wireless terminal shown in FIG. 9 is opened completely.

The folder 102 is provided with a sub-LCD 121a at its front surface 102a, and provided with a main LCD 121b (shown in FIG. 11) and a receiver 123 (shown in FIG. 11) at its rear surface facing the terminal body 101. In addition, the folder 102 is provided at its one end with a center hinge arm 125, which is adapted to be interposed between the side hinge arms 115a and 115b of the terminal body 101. The center hinge arm 125 is rotatably coupled between the side hinge arms 115a and 115b and adapted to rotate about the first rotation axis A1, thereby providing a second rotation axis A2 extending perpendicular or substantially perpendicular to the first rotation axis A1. Namely, the center hinge arm 125 is rotatably coupled between the side hinge arms 115a and 115b, and therefore the folder 102 is rotatable about the second rotation axis A2.

Figure 2:
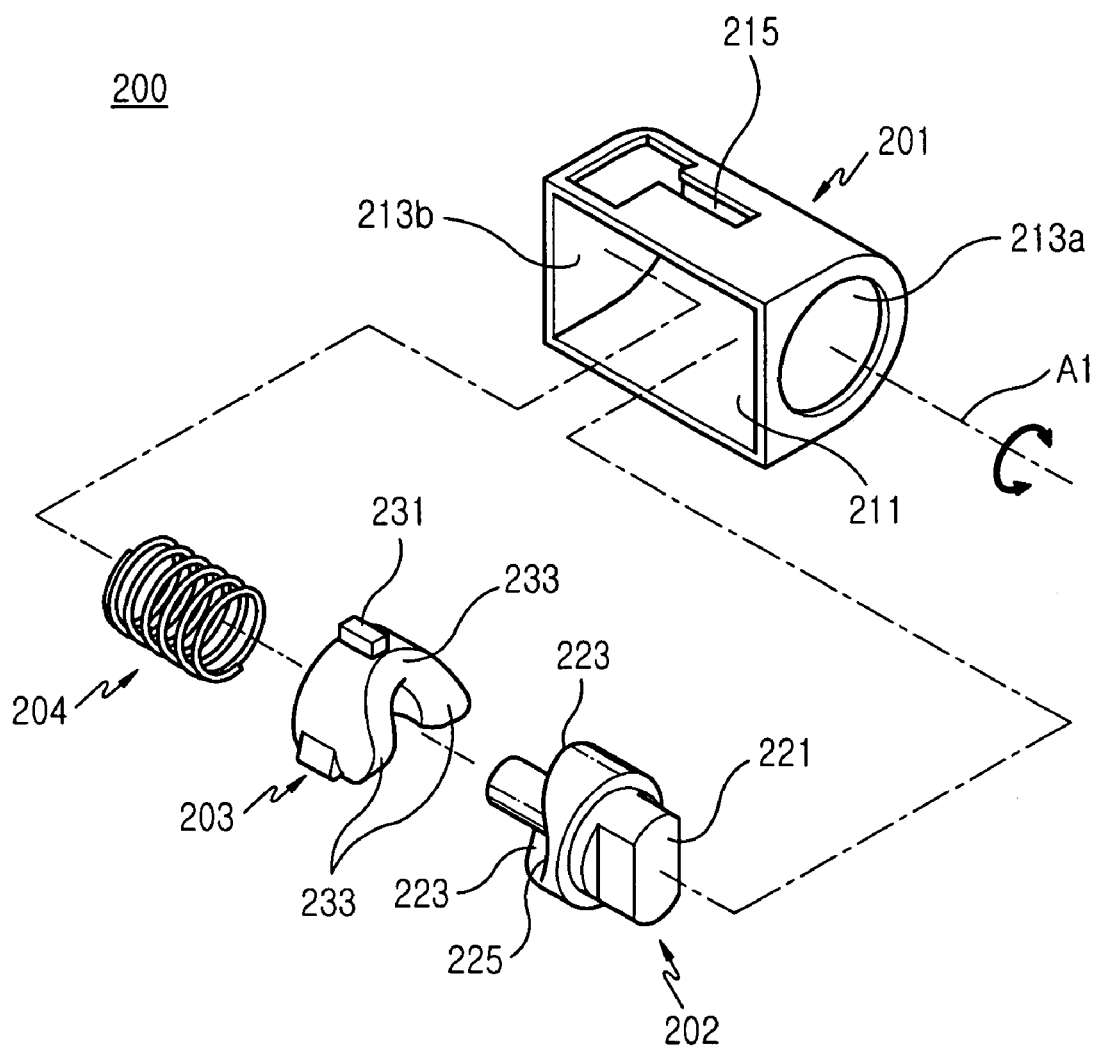
FIG. 2 is an exploded perspective view illustrating a hinge module shown in FIG. 1.
Figure 3A:
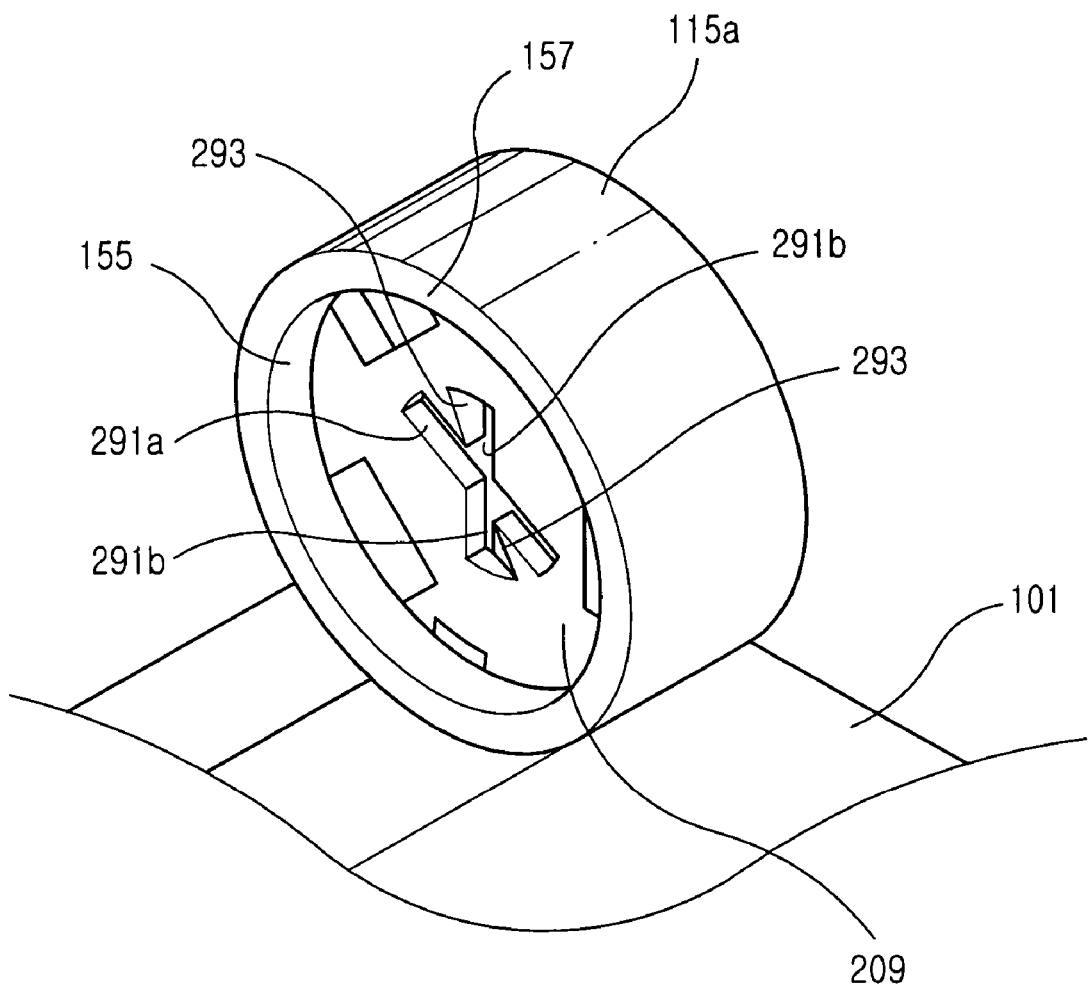
FIG. 3a is a perspective view illustrating the inner surface of a first side hinge arm provided in the portable wireless terminal shown in FIG. 1.
Figure 3B:
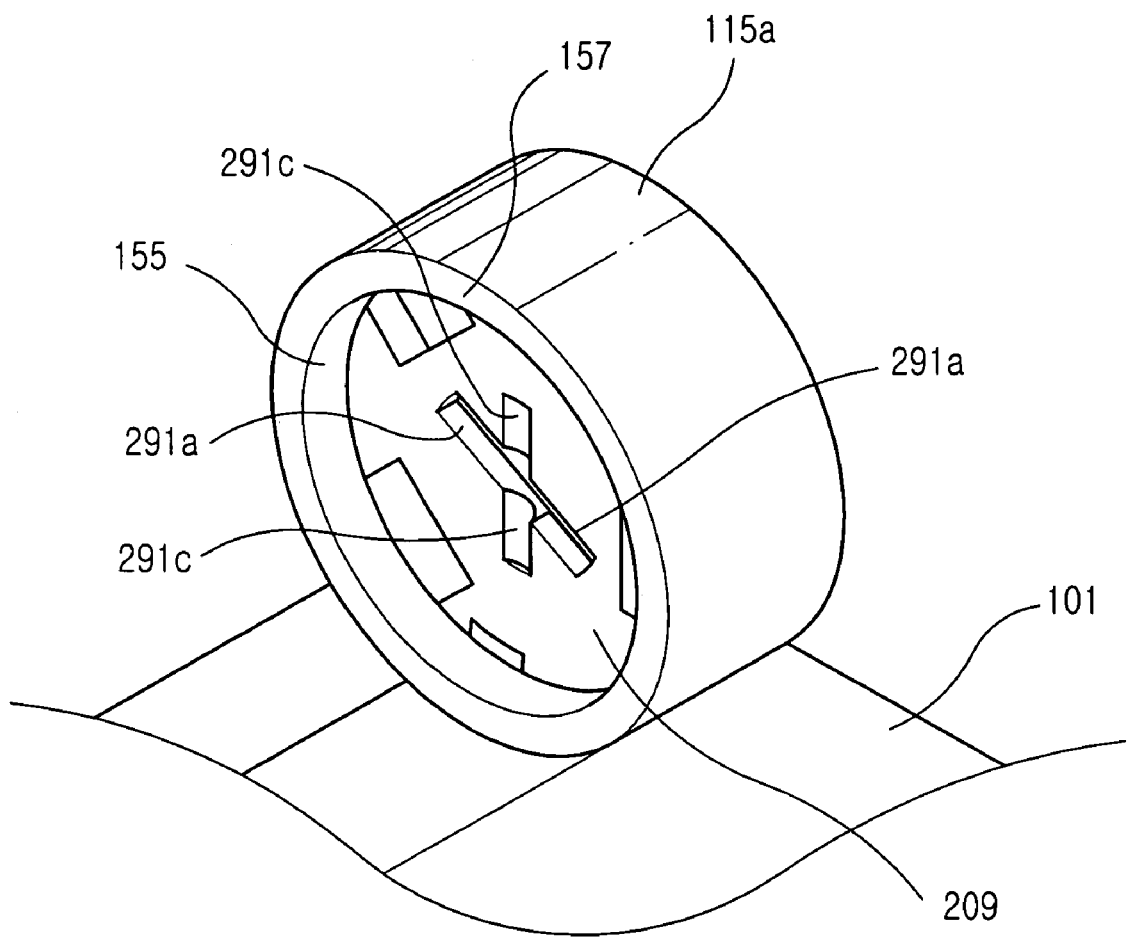
FIG. 3b is a perspective view illustrating another configuration of the inner surface of the first side hinge arm provided in the portable wireless terminal shown in FIG. 1.

The rotation-stop mechanism for the folder 102 of the portable wireless terminal 100 according to an embodiment of the present invention will be described in detail with reference to FIGS. 1 to 3b, FIG. 2 is an exploded perspective view illustrating the hinge module 200 shown in FIG. 1. FIG. 3a is a perspective view illustrating the inner surface of the first side hinge arm provided in the portable wireless terminal shown in FIG. 1. FIG. 3b is a perspective view illustrating another configuration of the inner surface of the first side hinge arm provided in the portable wireless terminal shown in FIG. 1. As shown in FIGS. 1 to 3b, the rotation-stop mechanism for the folder 102 comprises the hinge module 200 and hinge dummy 209.

As shown in FIG. 2, the hinge module 200 has a hinge housing 201, a hinge shaft 202, a hinge cam 203, and a coil spring 204.

The hinge housing 201 is configured to be received in the center hinge arm 125, and defines a receiving space 211 with a lengthwise opening. The receiving space 211 is also opened at its one end by an opening 213a and closed at the other end by a blind wall member 213b. The hinge housing 201 is formed with a sliding guide slit 215 linearly and longitudinally extended at the upper surface thereof. Although the sliding guide slit 215 is configured to communicate the inner and outer sides of the hinge housing 201, the sliding guide slit 215 may be substituted with a certain-shaped groove (not shown) recessed at the inner surface of the hinge housing 201.

The hinge shaft 202 is configured to be rotatably received in the hinge housing 201, and formed at its one end with a hinge protrusion 221. The hinge protrusion 221 is extended vertically and protruded outwardly through the opening 213a of the hinge housing 201 in a direction of the first rotation axis A1. The hinge shaft is also formed with a pair of mountain-shaped portions 223 at the opposite end of the hinge protrusion 221. A pair of the mountain-shaped portions 223 form a valley-shaped portion 225 therebetween. The hinge protrusion 221 is adapted to be fixedly coupled to the terminal body 101 of the portable wireless terminal 100, more particularly to the side hinge arm 115a of the terminal body 101 through the hinge dummy 209.

The hinge cam 203 is configured to be received in the hinge housing 201 and adapted to come into close contact with the end of the hinge shaft 202 formed with the mountain-shaped portions 223. For this, the hinge cam 203 is provided at its one end with valley-shaped portions 233 corresponding to the mountain-shaped portions 223 of the hinge shaft 202, and a mountain-shaped portion 235 between the valley-shaped portions 233. The hinge cam 203 is also provided with a guide step 231 at a certain position of the outer peripheral surface thereof. The guide step 231 is configured to be positioned within the sliding guide slit 215 of the hinge housing 201 and adapted to guide the linear movement of the hinge cam 203. According to the configuration of the hinge cam 203, where the hinge shaft 202 rotates in a state wherein it is in close contact with the hinge cam 203, the mountain-shaped portions 223 of the hinge shaft 202 are separated from the valley shaped portions 233 of the hinge cam 203, respectively, and moved to come into close contact with the mountain-shaped portion 235 of the hinge cam 203, thereby pushing the hinge cam 203 in the direction of the first rotation axis A1.

The coil spring 204 is supported by the blind wall member 213b of the hinge housing 201 and adapted to elastically push the hinge cam 203, thereby urging the hinge cam 203 to push the hinge shaft 202. As a result, the hinge shaft 202 rotates so that the mountain-shaped portions 223 of the hinge shaft 202 are engaged with the valley-shaped portions 233 of the hinge cam 203.

The hinge module 202, constructed as stated above, can be manufactured in accordance with U.S. Pat. No. 6,292,980 (discussed above).

Referring to FIGS. 1 and 3a, the hinge dummy 209 is formed with first and second hinge holes 291a and 291b, which are adapted to be selectively coupled with the hinge protrusion 221. The hinge dummy 209 is fixed just inside the side hinge arm 115a. The first and second hinge holes 291a and 291b penetrate the hinge dummy 209 and are extended in a radial direction of the hinge dummy 209. In addition, the first and second hinge holes 291 and 291b cross each other at a certain angle on the first rotation axis. The crossing angle between the first and second hinge holes 291a and 291b is variable in accordance with an angle defined between the terminal body 101 and the folder 102 opened away from the terminal body 101. For example, where the folder 102 is opened away from the terminal body 101 at an angle of or about 150°, the crossing angle between the first and second hinge holes 291a and 291b may be set at or about 60°. When the folder 102 is opened away from the terminal body 101 at an angle of or about 155°, the crossing angle may be set at or about 65°. The first and second hinge holes 291a and 291b are adapted to be selectively coupled with the hinge dummy 209. The hinge dummy 209 is further formed with an inclined surface 293 at its certain surface facing the hinge module 200. The inclined surface 293 extends diagonally toward an opening direction of the folder 102 from the second hinge hole 291b.

FIG. 3b illustrates another configuration of the second hinge hole. The second hinge hole 291c shown in FIG. 3b has generally symmetrically curved surfaces of a gentle slope.

Referring again to FIG. 1, the rotation-stop mechanism for the folder 102 further comprises a button 251, which serves to selectively separate the hinge protrusion 221 from the first hinge hole 291a or second hinge hole 291b as occasion demands. The button 251 is positioned on the seating surface 150 of the side hinge arm 115a and is adapted to linearly reciprocate in the direction of the first rotation axis A1. The button 251 has a release protuberance 253, which extends in the direction of the first rotation axis A1 and adapted to be protruded through the perforated hole 151 of the seating surface 150 at its one end. The protruded end of the release protuberance 253 is positioned adjacent to a cross point of the first and second hinge holes 291a and 291b of the hinge dummy 209. As the button 251 reciprocates linearly, the protruded end of the release protuberance 253 passes the cross point of the first and second hinge holes 291a and 291b. Therefore, if the button 251 is pushed under a state wherein the hinge protrusion 221 is coupled into the first hinge hole 291a or second hinge hole 291b, the hinge protrusion 221 is separated from the first hinge hole 291a or second hinge hole 291b.

The button 251 and the seating surface 150 have a coil spring 263 interposed therebetween. The coil spring 263 serves to provide a restoring force to the button 251 when the button 251 is pushed. Meanwhile, when the button 251 is pushed, the release protuberance 253 of the button 251 retracts the hinge shaft 202 into the hinge housing 201. At this time, the coil spring 204 supported within the hinge housing 201 is adapted to accumulate an elastic force therein in an advancing direction of the hinge shaft 202. This elastic force may also act as a restoring force for causing the button 251 to return to its original state before being pushed. Therefore, the coil spring 263 may be considered as an additional component for securing the operational reliability of the button 251.

The rotation-stop mechanism further comprises a cover 257, which serves to prevent the button 251 from separating from the seating surface 150 and to improve the appearance of the side hinge arm 115a. The cover 257 is formed with an opening 259, through which the button 251 is protruded in a direction away from the release protuberance 253. The cover 257 is also formed with a hook-shaped fixture 261 for fixing the cover to the side hinge arm 115a. The fixture 261 is fitted into one of the fitting slots 153 formed at the side hinge arm 115a.

The rotation-stop mechanism for the folder 102 of the portable wireless terminal 100 constructed as stated above is adapted to stop the rotation of the folder 102 when it is opened away from the terminal body 101 at an angle of or about 90°, or to allow the folder 102 to rotate so as to be nearly completely opened, in accordance with the manipulation of the user. The opening and closing operations of the folder 102 will be described with reference to FIGS. 1 to 8. FIGS. 4 to 8 illustrate the terminal body 101 and folder 102, respectively, in order to show the position of the hinge protrusion 221 according to the opening and closing state of the folder 102.

Referring to FIG. 1, when the hinge module 200 is received in the center hinge arm 125, the mountain-shaped portions 223 of the hinge shaft 202 are engaged with the valley-shaped portions 233 of the hinge cam 203 and therefore there is no generation of rotating force. At this time, the hinge protrusion 221 is aligned in a direction of the second rotation axis A2, namely, in a longitudinal direction of the folder 102.

Figure 4:
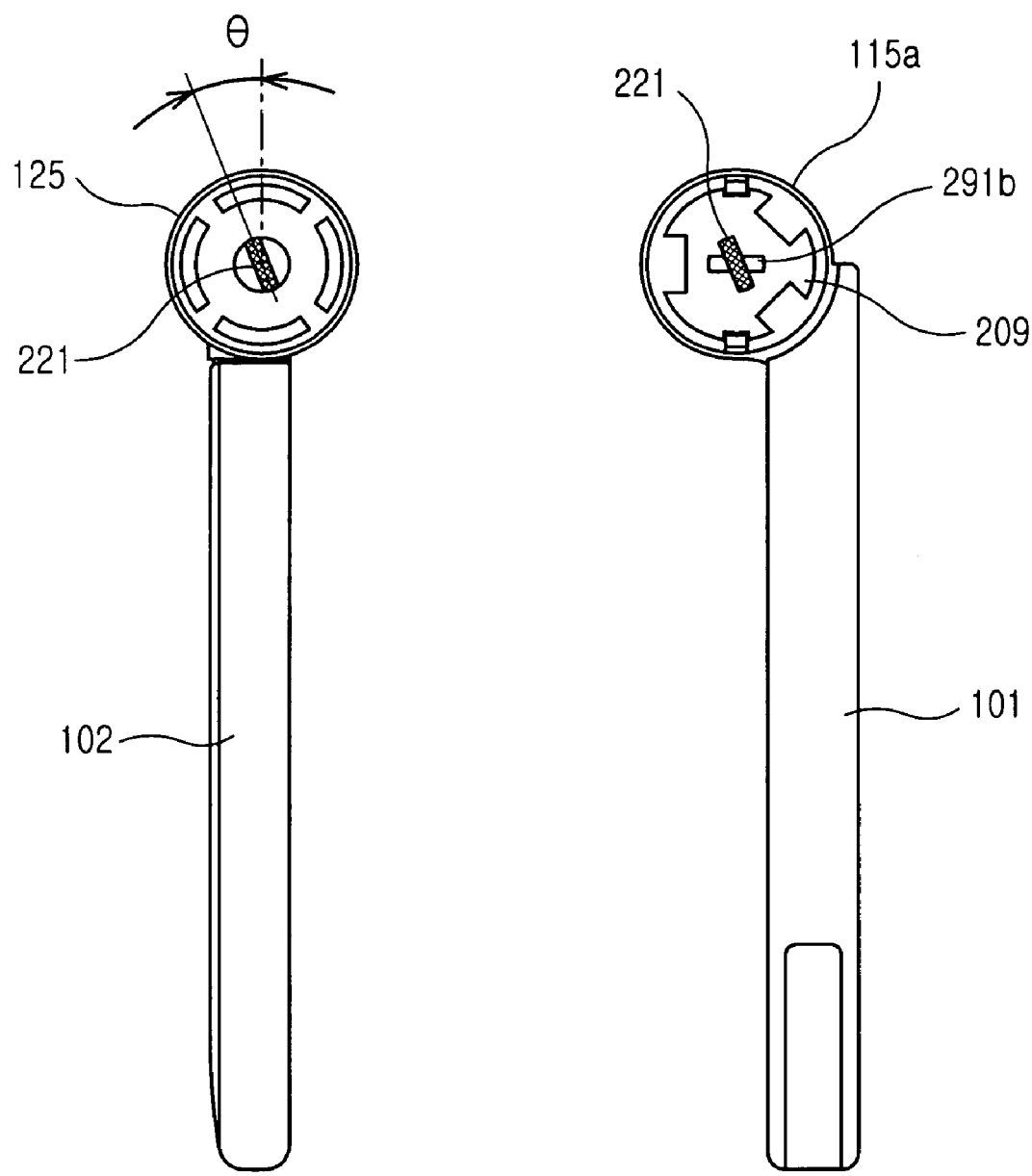
FIGS. 4 to 8 are views explaining the operations of the rotation-stop mechanism for the folder and of the portable wireless terminal shown in FIG. 1.

Referring to FIG. 4, the hinge dummy 209 is assembled in the side hinge arm 115a so that the first hinge hole 291a is inclined at a certain angle relative to a longitudinal direction of the terminal body 101 and the second hinge hole 291b is aligned perpendicular or substantially perpendicular to the longitudinal direction of the terminal body 101. If the folder 102 is opened away from the terminal body 101 at an angle of or about 150°, an angle ? defined between the first hinge hole 291a and the longitudinal direction of the terminal body 101 is or about 30°. If the folder 102 is assembled to the terminal body 101 to come into close contact with it, the hinge protrusion 221 is adapted to be coupled into the first hinge hole 291a. Initially, the hinge protrusion 221 is aligned in the longitudinal direction of the folder 102. Therefore, when the hinge protrusion 221 is coupled into the first hinge hole 291a, the hinge module 200 accumulates a rotating force therein, which acts to cause the folder 102 to come into close contact with the terminal body 101. Due to the reactive force of the rotating force accumulated in the hinge module 200, the hinge protrusion 221 is adapted to receive a rotating force, thereby being aligned in the longitudinal direction of the folder 102. As a result, the mountain-shaped portions 223 of the hinge shaft 202 are separated from the valley-shaped portions 233 of the hinge cam 203, and rotate at an angle of or about 30°.

Figure 5:
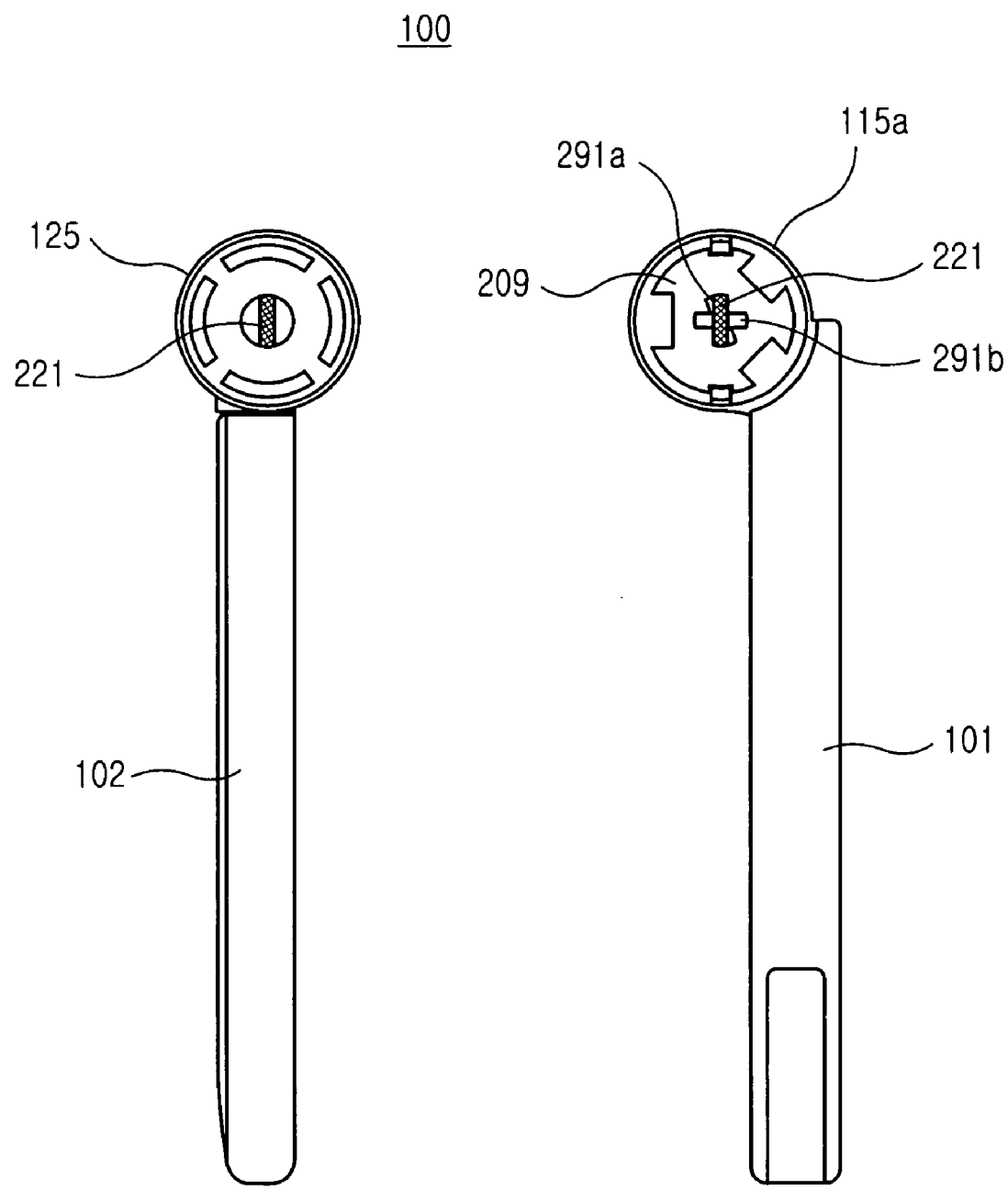

In this state, if the user pushes the button 251, the hinge protrusion 221 is separated from the first hinge hole 291a by the release protuberance 253. At the moment that the hinge protrusion 221 is completely separated from the first hinge hole 291a, the rotating force accumulated in the hinge module 200 rotates the hinge protrusion 221, thereby aligning the hinge protrusion 221 in the longitudinal direction of the folder 102. As shown in FIG. 5, the hinge protrusion 221, which is separated from the first hinge hole 291a, is aligned in the longitudinal direction of the folder 102. At this time, the hinge shaft 202 is retracted a certain distance into the hinge housing 201, and the coil spring 204 accumulates an elastic force in the advancing direction of the hinge shaft 202. In addition, the mountain-shaped portions 223 of the hinge shaft 202 are engaged with the valley-shaped portions 233 of the hinge cam 203.

Figure 6:
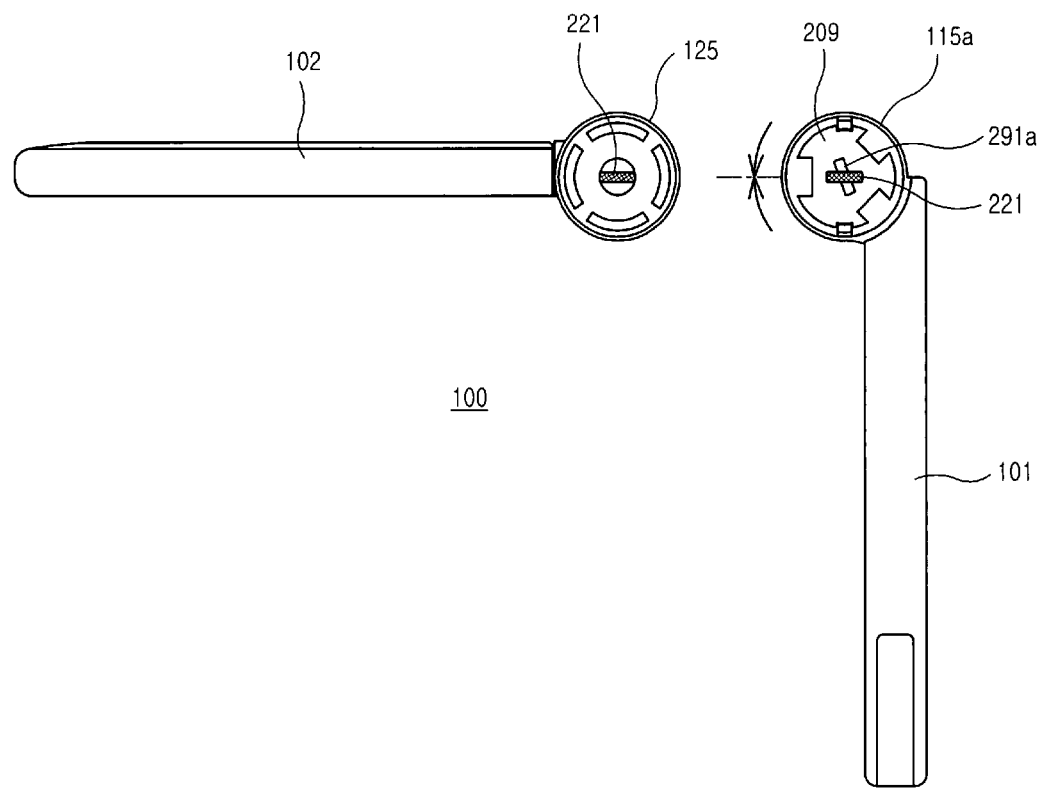

When the hinge protrusion 221 is separated from the first hinge hole 291a and aligned in the longitudinal direction of the folder 102, the hinge protrusion 221 rotates along with the folder 102 when the user opens the folder 102. Referring to FIG. 6, where the folder 102 is opened at an angle of or about 90°, the hinge protrusion 221 is coupled into the second hinge hole 291b. In this example, the hinge protrusion 221 and the second hinge hole 291b face each other, and the hinge protrusion 221 is advanced by the elastic force of the coil spring 204, thereby being coupled into the second hinge hole 291b. Concurrently, the mountain-shaped portions 223 of the hinge shaft 202 are still engaged with the valley-shaped portions 233 of the hinge cam 203, and the hinge module 200 is in a state wherein there is no accumulation of rotating force. Therefore, the folder 102 is adapted to stably maintain a specific state wherein it is opened away from the terminal body 101 at an angle of or about 90°.

Figure 7:
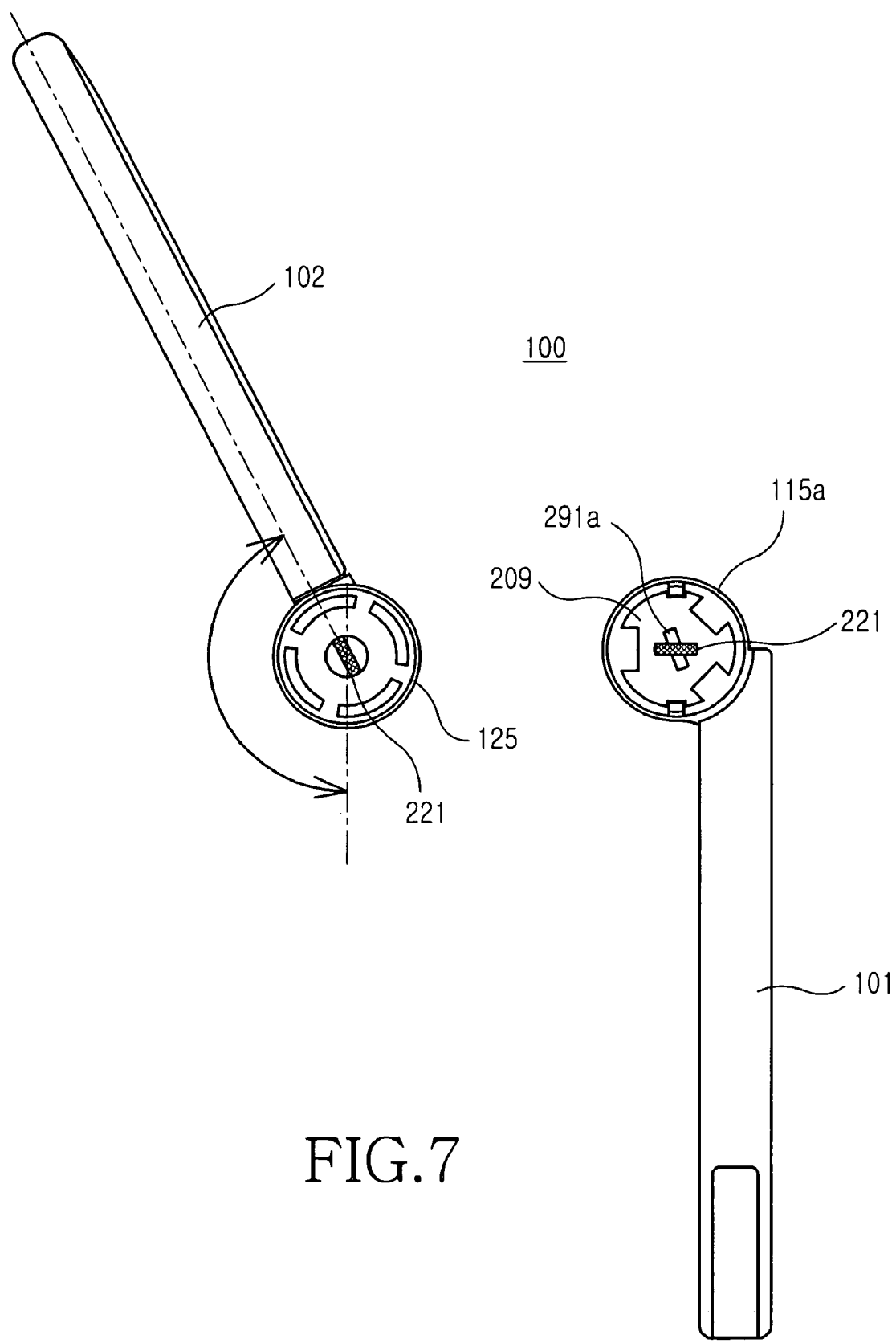

As stated above, when the folder is opened at an angle of or about 90°, the hinge protrusion 221 is engaged with the second hinge hole 291b. If the user further opens the folder 102 up to an angle of or about 150°, the hinge module 200 gradually accumulates a rotating force therein, as shown in FIG. 7, due to the hinge protrusion 221 coupled into the second hinge hole 291b, which acts to cause the hinge protrusion 221 to be aligned in the longitudinal direction of the folder 102. If the rotating force accumulated in the hinge module 200 exceeds a predetermined value, the rotating force causes the hinge protrusion 221 to move along the inclined surface 293 of the second hinge hole 291b, thereby coupling the hinge protrusion into the first hinge hole 291a. Furthermore, in the case of the second hinge hole 291c (formed by the curved surface of the gentle slope, as shown in FIG. 3b), the hinge protrusion 221 is adapted to be more easily separated from the second hinge hole 291c. If the hinge protrusion 211 fails to be separated from the second hinge hole 291b, the user can forcibly separate the hinge protrusion 211 from the second hinge hole 291b by pushing the button 251.

Figure 8:
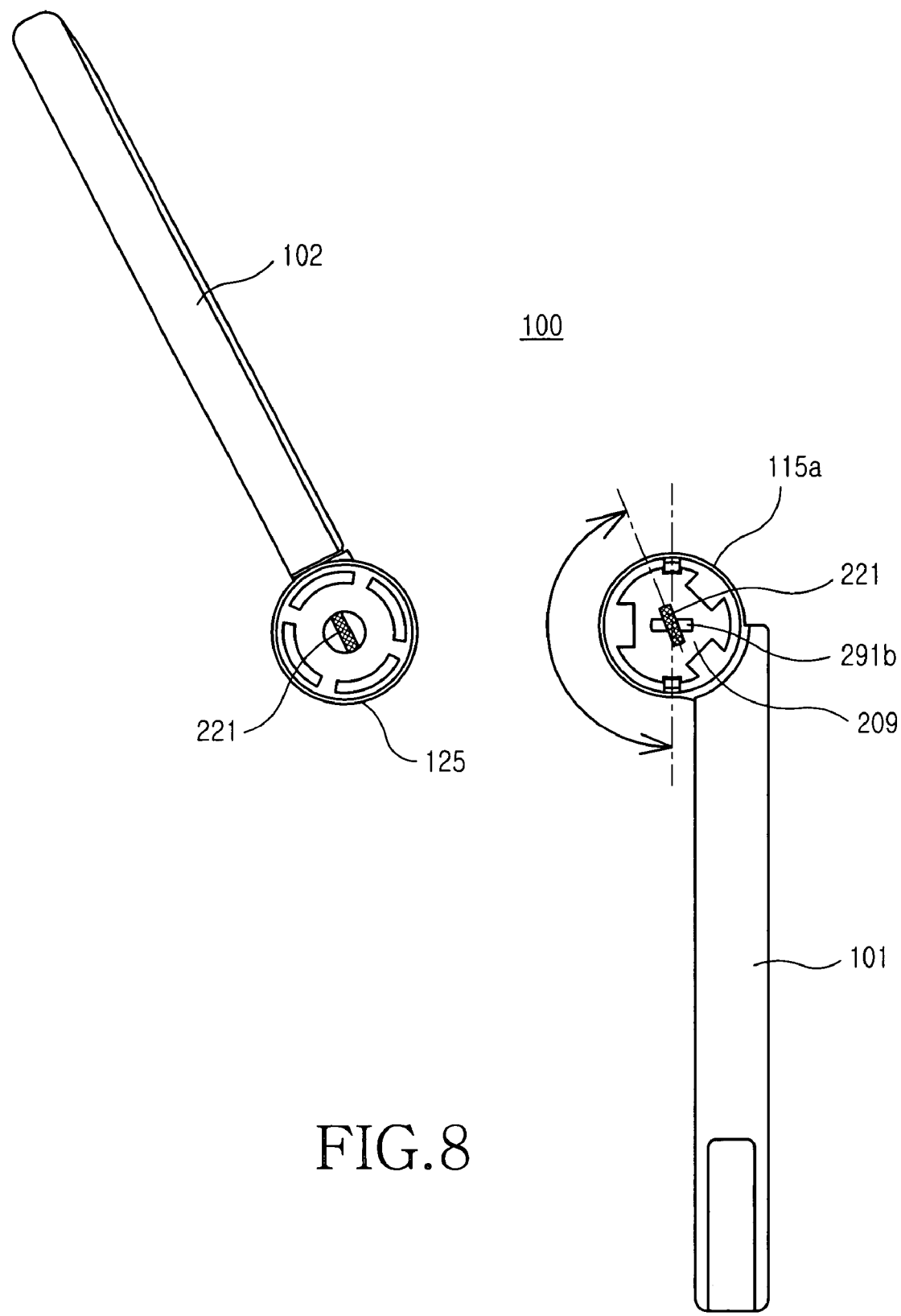

Referring now to FIG. 8, the folder 102 is completely opened away from the terminal body 101, and the hinge protrusion 221 is coupled again with the first hinge hole 291a. At the same time, the mountain-shaped portions 223 of the hinge shaft 202 are engaged with the valley-shaped portions 233 of the hinge cam 203, and therefore there is no accumulation of rotating force in the hinge module 200. While in this state, if the user closes the folder 102, causing it to come into close contact with the terminal body 101, the portable wireless terminal 100 and hinge module 200 are returned to their initial assembled state.

In the initial assembled state of the portable wireless terminal 100 and hinge module 200, the user can stably fix the folder 102 in a position perpendicular or substantially perpendicular to the terminal body 101 by manipulating the button 251.

Where the user opens the folder 102 without manipulating the button 251 in the initial assembled state of the portable wireless terminal 100 and hinge module 200, the folder 102 is opened completely without pausing until it reaches its complete open state. However, when the user does not manipulate the button 251, the folder 102 of the portable wireless terminal 100 experiences the same opening and closing operation as the conventional portable wireless terminal.

Thus, when the hinge module 200 is assembled in the center hinge arm 125, and the hinge protrusion 221 is aligned in a direction different from the longitudinal direction of the folder 102, the alignment direction of the first and second hinge holes 291a and 291b provided in the hinge dummy 209 should be changed to corresponding to the alignment direction of the hinge protrusion 221.

Figure 9:
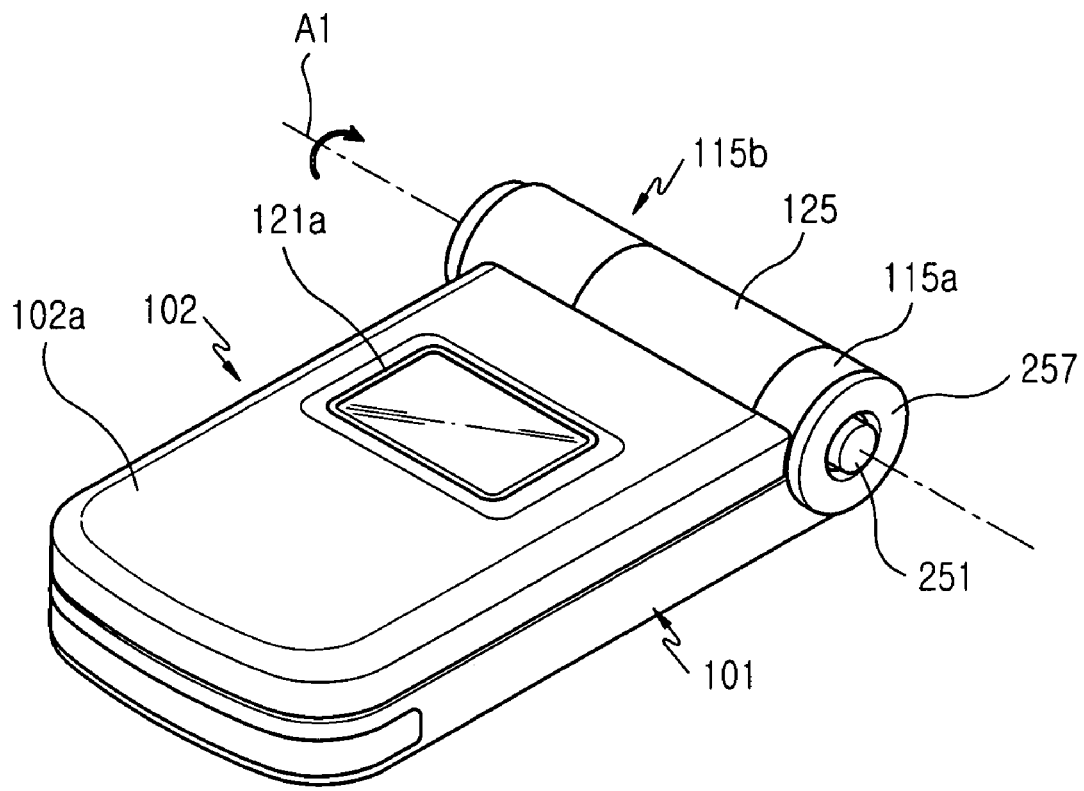
FIG. 9 is a perspective view illustrating an assembled, closed state of the portable wireless terminal shown in FIG. 1.
Figure 10:
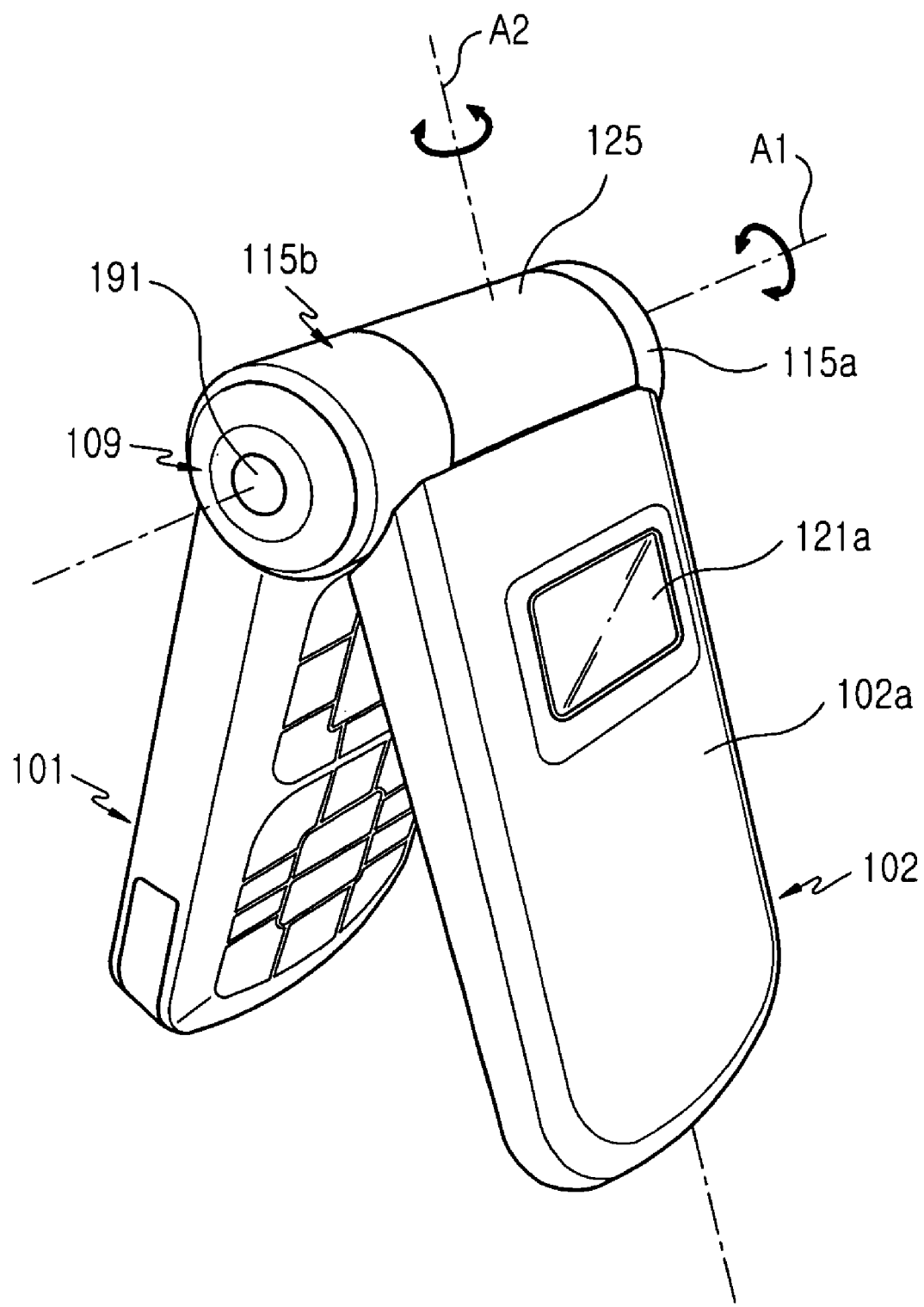
FIG. 10 is a perspective view of the portable wireless terminal, viewed from the opposite side of the FIG. 9.

Attention is now directed to FIGS. 9–12 and the operation of the portable wireless terminal 100, having the hinge module 200 constructed as stated above, will be described. As shown in FIGS. 9 and 10, the side hinge arm 115b of the portable wireless terminal 100 is configured to install the camera unit 109 therein. To accommodate the camera unit 109, the side hinge arm 115b is provided with an exposure window 191 at its one side end. The other side hinge arm 115a is provided with the button 251 at the opposite side end. Meanwhile, as stated above, the portable wireless terminal 100 has the first rotation axis A1 extending transversely to the terminal body 101, and the second rotation axis A2 perpendicular or substantially perpendicular to the first rotation axis A1. The first rotation axis A1 is a central axis for rotation movements of the folder 102. The folder 102 is opened and closed about the first rotation axis A1. The folder 102, when opened away from the terminal body 01, is allowed to exchange its front and rear surfaces with each other about the second rotation axis A2.

Figure 12:
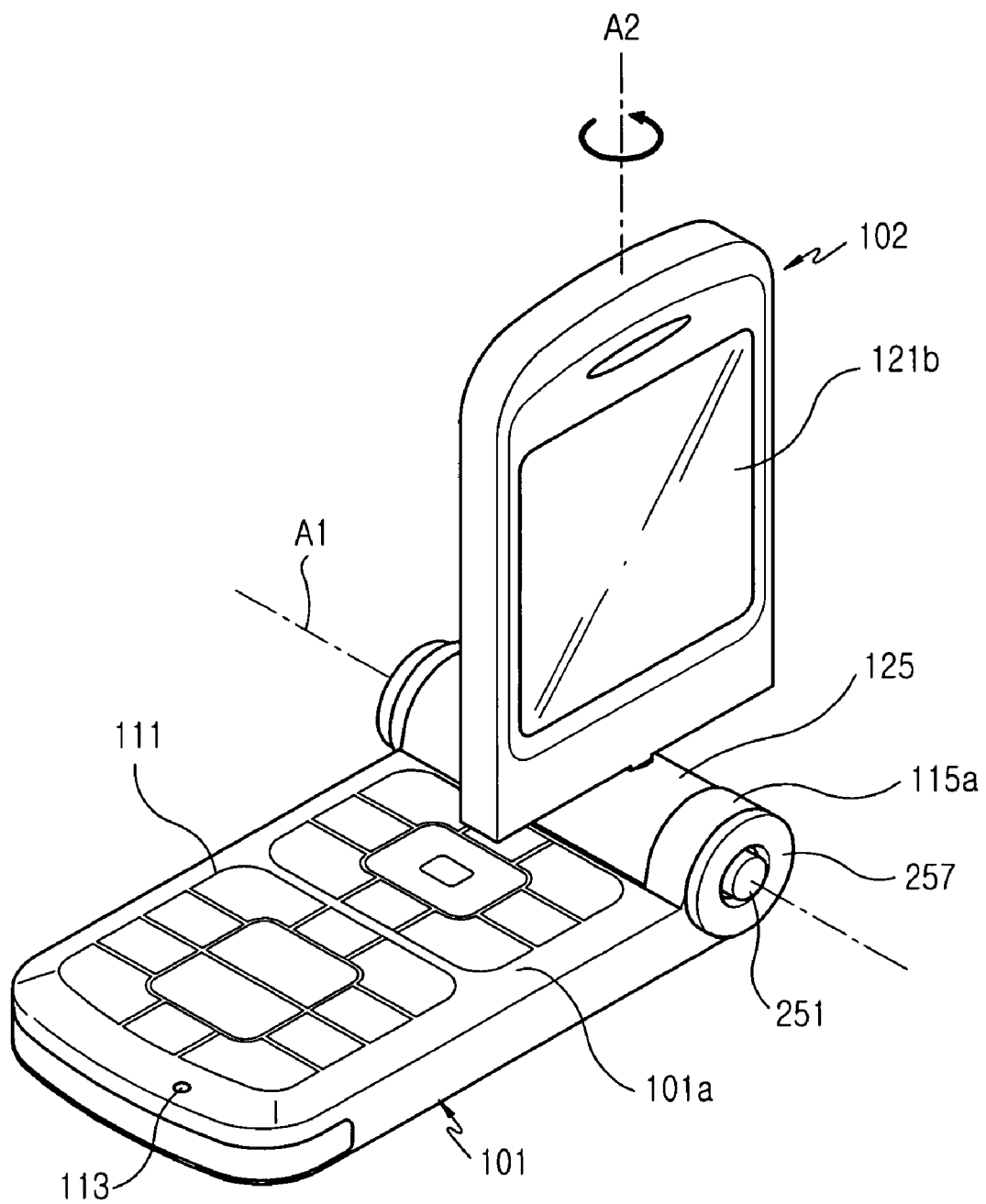
FIG. 12 is a perspective view illustrating a state wherein the opened folder of the portable wireless terminal shown in FIG. 9 is rotated.

When the folder 102 is in close contact with the terminal body 101, the user can open the folder 102 by manipulating the button 251, causing the folder 102 to rotate about axis A1 and stop at a position perpendicular or substantially perpendicular to the terminal body 101. As shown in FIG. 12, the folder 102 is adapted to rotate about the second rotation axis A2, thereby allowing the main LCD 121b provided at the folder 102 to be aligned in the same direction as the button 251. As a result, the user is allowed to conveniently capture images using a camera lens involved in the side hinge arm 115b. Although not shown, if the main LCD 121b of the folder 102 is aligned in the same direction as the exposure window 191, the user may perform video communications using the portable wireless terminal 100.

If the user opens the folder 102, which is in close contact with the terminal body 101, until it is just opened away from the terminal body 101, at an angle of over or about 60°, without manipulating the button 251, the folder 102 is adapted to be naturally opened to an angle of or about 150° due to the rotating force of the hinge module 200 even if no additional external force is applied thereto. FIG. 12 illustrates a state wherein the folder 102 is completely opened.

Even though the user intends to stop the rotation of the folder 102 at an angle of or about 90°, if there is no manipulation of the button 251 after the folder 102 is opened away from the terminal body 101 up to or about 150°, the folder 102 is adapted to be opened away from or closed to the terminal body 101 within a range from at or about 0° to at or about 150° without being stopped at or about 90°.

In construction of the rotation-stop mechanism for the folder 102, an exemplary rotation-stop mechanism can have means for preventing the center hinge arm 125 from being separated from the side hinge arms 115a and 115b when the hinge protrusion 221 is separated from the first hinge hole 291a or second hinge hole 291b. According to an embodiment of the present invention, the center hinge arm 125 is formed with a guide groove 127 (shown in FIG. 1) at the outer peripheral surface of its one end, and the side hinge arm 115a is formed with a guide rib 157 (shown in FIG. 3a) extended outwardly along the inner side edge thereof, in correspondence to the guide groove 127. Therefore, the center hinge arm 125 is fitted at its one end into a coupling hole 155 defined by the guide rib 157, thereby preventing the center hinge arm 125 from being separated from the side hinge arms 115a and 115b. Additionally, as one skilled in the art can appreciate, the guide groove 127 can be formed at the side hinge arm 115a, and the guide rib 157 can be formed at the center hinge arm 125.

As apparent from the above description, a rotation-stop mechanism for a folder of a portable wireless terminal in accordance various embodiments of the present invention can smoothly perform the opening and closing operations of the folder, and cause the rotation of the folder to be stopped in a state wherein the folder is opened away from a terminal body at an angle of or about 90° as occasion demands. Therefore, it is possible to freely set an opening angle of the folder at angles of at or about 90° or at or about 150°. Further, since the folder can be stably fixed when it is opened away from the terminal body at an angle of or about 90°, the portable wireless terminal having a camera lens enables stable image capturing and video communications.

Although certain embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A rotation-stop mechanism for a folder of a portable wireless terminal, the portable wireless terminal comprising a terminal body, the folder rotatably coupled to the terminal body and adapted to rotate about a first rotation axis extending transversely to the terminal body so as to be opened away from or closed to the terminal body, and a hinge module for rotatably coupling the terminal body to the folder, wherein the terminal body is formed with side hinge arms at both sides of its one end, and the folder is formed at its one end with a center hinge arm rotatably coupled between the side hinge arms through the hinge module, and the hinge module is received in the center hinge arm and adapted to provide a rotating force for causing the folder to be opened away from or closed to the terminal body according to its opened angle from the terminal body; the rotation-stop mechanism comprising: a hinge dummy having at least two hinge holes extending radially, the hinge dummy being fixed to an inner surface of one of the side hinge arms; a hinge protrusion protruded through one end of the hinge module and adapted to be selectively coupled into one of the hinge holes; and a button mounted on the one of the side hinge arms, the button serving to separate the hinge protrusion from the hinge hole.

2. The rotation-stop mechanism for the folder of the portable wireless terminal as set forth in claim 1, wherein the hinge holes are comprised of first and second hinge holes, which cross each other at a certain angle on the first rotation axis.

3. The rotation-stop mechanism for the folder of the portable wireless terminal as set forth in claim 2, wherein the second hinge hole has symmetrically curved surfaces of a gentle slope.

4. The rotation-stop mechanism for the folder of the portable wireless terminal as set forth in claim 2, wherein in a state in which the folder comes into close contact with the terminal body and is thus closed to the terminal body, the hinge protrusion is coupled into the first hinge hole, and the hinge module accumulates a rotating force therein, the rotating force acting to cause the folder to be closed to the terminal body.

5. The rotation-stop mechanism for the folder of the portable wireless terminal as set forth in claim 4, wherein as the button is pushed, the hinge protrusion is separated from the first hinge hole and adapted to rotate at a certain angle by the rotating force accumulated in the hinge module.

6. The rotation-stop mechanism for the folder of the portable wireless terminal as set forth in claim 5, wherein if the folder rotates to be opened away from the terminal body, the hinge protrusion rotates with the folder, and is coupled into the second hinge hole at a position where the folder is opened at an angle of or about 90°, thereby stopping rotation of the folder.

7. The rotation-stop mechanism for the folder of the portable wireless terminal as set forth in claim 6, wherein if the folder further rotates to be opened away from the terminal body, the hinge protrusion is separated from the second hinge hole and coupled into the first hinge hole in a state wherein the folder is completely opened.

8. The rotation-stop mechanism for the folder of the portable wireless terminal as set forth in claim 7, wherein the hinge dummy is further formed with an inclined surface adjacent to the second hinge hole, and the hinge protrusion is separated from the second hinge hole by a rotating force of the folder.

9. The rotation-stop mechanism for the folder of the portable wireless terminal as set forth in claim 7, wherein the hinge protrusion is separated from the second hinge hole when the button is pushed.

10. The rotation-stop mechanism for the folder of the portable wireless terminal as set forth in claim 4, wherein if the folder is opened away from the terminal body in excess of a certain angle in a state wherein the hinge protrusion is coupled into the first hinge hole, the folder is opened to a predetermined angle within a range from at or about 90° to at or about 180° by the rotating force of the hinge module.

11. The rotation-stop mechanism for the folder of the portable wireless terminal as set forth in claim 1, wherein the button linearly reciprocates in a direction of the first rotation axis, and is formed with a release protuberance extended to the inner surface of the side hinge arm, and whereby the button, when it is pushed, serves to cause the hinge protrusion to be separated from the hinge hole by the release protuberance.

12. A rotation-stop mechanism for a folder of a portable wireless terminal, the portable wireless terminal comprising a terminal body formed with side hinge arms at both sides of its one end, the folder formed at its one end with a center hinge arm rotatably coupled between the side hinge arms and adapted to rotate about a first rotation axis extending transversely to the terminal body, and a hinge module for rotatably coupling the terminal body to the folder, wherein the hinge module comprises: a hinge housing received in the center hinge arm, the hinge housing having a receiving space opened at its one side, an opening formed at one end thereof, and a sliding guide slit extending longitudinally along an inner surface thereof; a hinge shaft rotatably received in one end of the receiving space defined in the hinge housing, the hinge shaft being formed at its one end with a hinge protrusion protruding outwardly through the opening of the hinge housing and at the other end with valley-shaped portions; a hinge cam formed at its one end with mountain-shaped portions corresponding to the valley-shaped portions of the hinge shaft, and at its outer peripheral surface with a sliding step corresponding to the sliding guide slit of the hinge housing, the hinge cam being adapted to linearly reciprocate within the receiving space; and elastic means adapted to support the other end of the hinge cam and to cause the hinge cam to come into close contact with the hinge shaft, and wherein the rotation-stop mechanism comprises: a hinge dummy fixed to an inner surface of one of the side hinge arms, the hinge dummy having radially extended first and second hinge holes, the first and second hinge holes crossing each other at a certain angle on the first rotation axis, the hinge protrusion being selectively coupled to one of said first and second hinge holes.

13. The rotation-stop mechanism for the folder of the portable wireless terminal as set forth in claim 12, further comprising: a button coupled to an outer surface of the one of side hinge arms and adapted to linearly reciprocate in a direction of the first rotation axis, the button being formed with a release protuberance extended to the inner surface of the side hinge arm, whereby the button, when it is pushed, serves to cause the hinge protrusion to be separated from the first hinge hole or second hinge hole by the release protuberance.

14. The rotation-stop mechanism for the folder of the portable wireless terminal as set forth in claim 13, further comprising: a cover fixedly coupled to an outer side of the side hinge arm and formed with an opening, through which the button is protruded outwardly.

15. The rotation-stop mechanism for the folder of the portable wireless terminal as set forth in claim 12, wherein in a state in which the folder is in close contact with the terminal body and closed to the terminal body, the hinge protrusion is coupled into the first hinge hole of the hinge dummy, and the hinge module accumulates a rotating force therein, which acts to cause the folder to come into close contact with the terminal body.

16. The rotation-stop mechanism for the folder of the portable wireless terminal as set forth in claim 12, wherein if the hinge protrusion is coupled into the second hinge hole in a state wherein the folder rotates and is opened perpendicular or substantially perpendicular to the terminal body, the valley-shaped portions of the hinge shaft and the mountain-shaped portions of the hinge cam are engaged with each other and therefore the rotation of the folder is stopped.

17. The rotation-stop mechanism for the folder of the portable wireless terminal as set forth in claim 16, further comprising: an inclined surface for allowing the hinge protrusion to be easily separated from the second hinge hole as the folder rotates to be opened, the inclined surface being formed along a rotating direction of the hinge protrusion from the second hinge hole, wherein if the folder further rotates to be opened away from the terminal body in a state wherein the folder is opened perpendicular or substantially perpendicular to the terminal body, the hinge protrusion is separated from the second hinge hole and therefore rotates with the folder.

18. The rotation-stop mechanism for the folder of the portable wireless terminal as set forth in claim 12, further comprising:
    a button mounted on one of the side hinge arms for separating the hinge protrusion from the first or second hinge hole.

* * * * *